Figure 1:
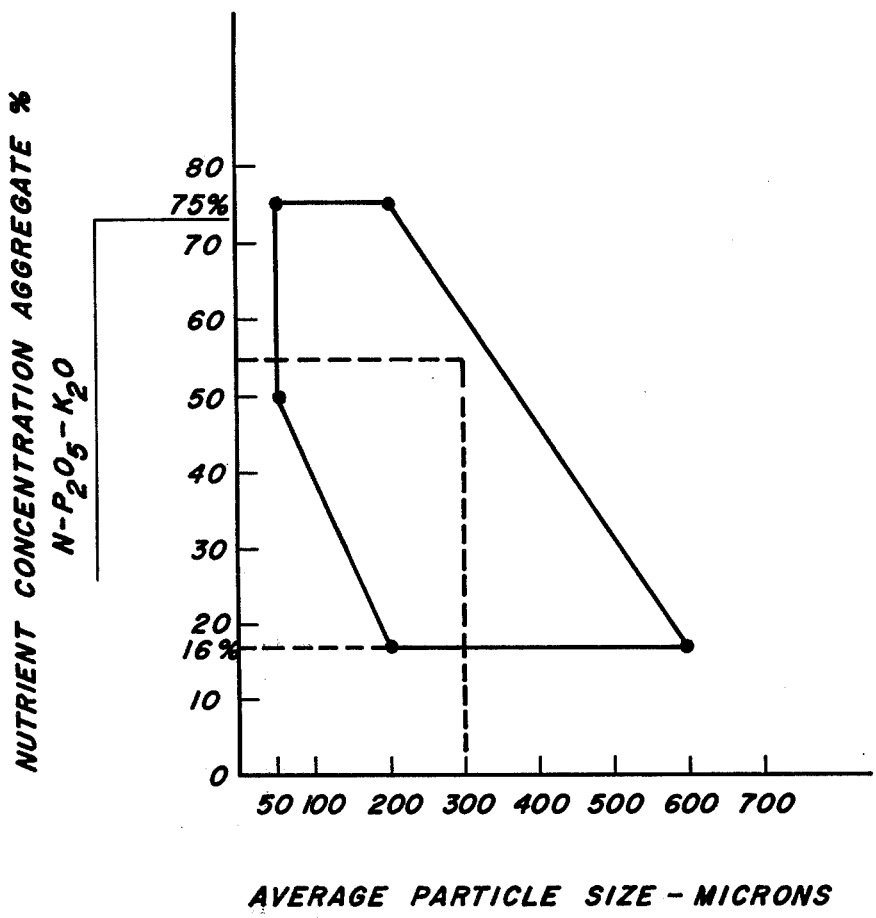

United States Patent [19]

Clapp et al.

[11] 4,038,064
[45] July 26, 1977

[54] FOLIAR APPLICATIONS OF UREA-POLYPHOSPHATE-POTASSIUM SOLUTIONS TO CROPS

[75] Inventors: John G. Clapp, Greensboro, N.C.; Donald Lee Johnson, Omaha, Nebr.; James Earl Sansing, Jr., Baton Rouge, La.

[73] Assignee: Allied Chemical Corporation, Morristown, N.J.

[21] Appl. No.: 602,714

[22] Filed: Aug. 7, 1975

[51] Int. Cl.$^2$ ............................................. C05B 15/00
[52] U.S. Cl. ........................................ 71/29; 71/33; 71/64 G
[58] Field of Search .................. 71/29, 64 C, 1, 11, 71/27, 31, 33, 64 G; 260/555

[56] References Cited

U.S. PATENT DOCUMENTS

| | | | |
|---|---|---|---|
| 2,770,538 | 11/1956 | Vierling | 71/29 |
| 3,087,806 | 4/1963 | Martin | 71/29 |
| 3,640,698 | 2/1972 | Backland | 71/29 |
| 3,679,390 | 7/1972 | Young | 71/29 |

FOREIGN PATENT DOCUMENTS

| | | | |
|---|---|---|---|
| 706,823 | 3/1965 | Canada | 71/29 |
| 1,590,621 | 6/1968 | France | 71/29 |
| 1,364,464 | 8/1974 | United Kingdom | 71/64 C |

*Primary Examiner*—Frank A. Spear, Jr.
*Assistant Examiner*—Ferris H. Lander
*Attorney, Agent, or Firm*—Michael S. Jarosz; Patrick L. Henry

[57] ABSTRACT

Urea-polyphosphate-potassium solution is applied to foliage of field crops such as soybeans, between flowering and seed set to increase yields.

21 Claims, 1 Drawing Figure

FOLIAR APPLICATIONS OF UREA-POLYPHOSPHATE-POTASSIUM SOLUTIONS TO CROPS

BACKGROUND OF THE INVENTION

This invention relates to a unique foliar fertilizer formulation and a method of applying same to field crops, particularly soybeans.

Previous work with foliar fertilization of crops, especially field crops and more particularly soybeans, has been done with mixed results. This is due to varying environment factors, soil fertilities and the inability to apply more than small quantities of foliar fertilizers without damaging plant tissue.

While some tests suggested that yield improvements could be achieved, others suggested that no improvements at all were realized from foliar application of nitrogen-phosphorus-potassium (N-P-K) solutions. The January, 1969 issue of "World Farming" contains a more complete dissertation of the benefits of N-P-K foliar fertilization and the limits of application level beyond which leaf scorch occurs. Another article reprinted from Ohio Farm and Home Research, Vol. 41, No. 302, September-October, 1956, reports no benefit from foliar application of N-P-K solutions.

SUMMARY OF THE INVENTION

The present invention is based on the discovery that certain solutions containing (a) nitrogen in the form of urea, (b) phosphorus in the form of predominantly linear polyphosphate and (c) potassium in a form essentially free of chlorides and sulfate and preferably combined with the phosphate, can be applied to certain crops, especially soybeans, at relatively high rates without damage to plant tissue; and when so applied during the period from shortly before flowering to shortly after beginning of seed fill, preferably before seed fill, result in a surprising increase in crop yield, especially in the case of soybeans.

In a presently preferred embodiment, a solution consisting essentially of the following constituents:

a. $H_2O$: 25 – 84%; preferably 50 –75% (expressed as weight);
b. Urea: 3 – 25%, preferably 3 – 15% (expressed as % N by weight);
c. Predominantly linear polyphosphate having at least 55% of the phosphate present in the form of "pyro," tripoly, or higher linear polyphosphates: 5 – 20%, preferably 5 – 25% (expressed as $P_2O_5$ by weight);
d. Potassium: 5 – 30%, preferably 5 – 25% (expressed as $K_2O$ by weight);
e. Free $NH_3$: Less than 3% based on total solution weight (preferably less than 2%);
f. Cl: Less than 2%, preferably less than 1%;
g. $SO_4$: Less than 2%, preferably less than 1%;
h. Other micronutrients such as sulfur, boron, zinc, iron, manganese and copper: None to nominal amounts as desired; is applied to the foliage of soybeans by a fine spray applicator between flowering and seen fill or pod development without damage to foliar tissue, and results, in most instances, in a significant yield increase at harvest, when applied at the rate of at least 25 pounds aggregate $N—P_2O_5—K_2O$ per acre in the following proportions:

| Component | Rate of Application, Lbs./Acre |
|---|---|
| Urea (as N), Lbs. | 2-60 - preferably 3-50 |
| Phosphorus (as $P_2O_5$) | 2-75 - preferably 3-50 |
| Potassium (as $K_2O$) | 2-75 - preferably 3-50 |

In the presently preferred embodiment, the aggregate rate of application is 40-150 pounds of $N—P_2O_5—K_2O$ per acre, preferably 40-75 pounds of $N—P_2O_5—K_2O$ per acre.

DESCRIPTION OF THE INVENTION

The present invention is based on the discovery that an aqueous solution of urea, $P_2O_5$ in predominantly linear polyphosphate form, and potassium in a form essentially free of chloride and sulfate can be applied to the foliage of certain crops, particularly soybeans, at relatively high rates compared to that previously experienced, so as to provide more efficient uptake of the nutrients without tissue damage and at a time when such nutrients can be used to advantage by the fruit.

The water component of the solution is present in concentrations of up to 84%, based on total solution weight, preferably 50 to 75%. The water concentration should be adequate to ensure adequate dispersion of the nutrients, and provide a product that is capable of being stored for reasonable times at the lowest expected ambient temperature, preferably 32° F., without the components salting out of solution to any significant degree. The minimum dilution also serves to prevent burning of the plants by a more concentrated solution. On the other hand, the water concentration should not exceed 75%, since higher dilutions would result in excessive application of solution to the plant at the high nutrient levels contemplated, with resulting loss of such nutrients by run-off to the soil at a time when the roots are inefficient at translocating the materials from the soil to the fruit. The preferred water dilution of 50 to 75% assures adequate dispersion on the one hand and minimum runoff on the other hand, resulting in maximum uptake by the plant of the N—P—K values in the solution.

The urea component is measured on a nitrogen basis and is preferably added to the solution in the form of urea liquor, although it can be added in other forms such as granular urea or crystal urea. It is preferably present in a concentration ranging from 3 to 25% expressed as N, preferably 3 to 15%. Biuret should be present in amounts less than 0.5% based on weight of urea to prevent burning of the plants.

The P and K components are expressed on a $P_2O_5$ and $K_2O$ weight basis, respectively. While they can be produced and added separately, they are preferably produced as a potassium-polyphosphate solution in a single manufacturing operation, for example, as disclosed in U.S. Pat. No. 3,607,018. However, the product must be dissolved in a solvent other than an aqueous ammonia solution to assure that the ultimate solution of the present invention contains less than 3% nitrogen, preferably less than 2%, in the ammoniacal form. A preferred solvent is water.

The phosphate component is present in the form of predominantly linear polyphosphates. Preferably, at least 55%, more preferably 60 to 80%, of the $P_2O_5$ is present in the form of pyrophosphate, tripolyphosphate or higher linear polyphosphates. Lesser concentrations of the polyphosphate result in solutions which have higher salting out temperatures and less micronutrient chelating ability. Higher concentrations of the "polyphosphate" form result in formation of metaphosphates which have lower solubilities than the linear form and are ineffectual in preventing formation of precipitates.

The potassium component and the solution should be essentially free of chloride and sulfate which have a burning effect on the plant when applied to the foliage. Chloride and sulfate should be present in amounts less than 2%, preferably less than 1%.

As noted above, solutions that are too highly concentrated have the potential to burn the crop. Also, as can be seen from Example I below, after a point, increased rate of application per acre results in no significant yield improvement. Thus, the rate of application for the N—P—K components must be adjusted to determined optimum conditions, basis soil fertility and other environmental factors so as to achieve the best fertilizer application rate to yield increase ratio.

Timing of application is also a significant factor. The solutions of this invention, if applied much before the flowering stage of growth, do not result in significant yield improvements. Likewise, when applied much later than the stage when fruit is beginning to grow, much of its value is also lost.

It has been found that this timing and rate of application bear a relationship to one another and to the crop to which they are applied, such that the rate of application and the timing thereof bear a relationship to the yield increase.

In addition, there is a relationship between particle size and concentration of nutrients in the solution. In the case of aerial application wherein a very fine average particle size on the order of 50–100 microns is achieved, a higher concentration of nutrients can be used, and also less solution per acre will be applied. When using larger droplets on the order of 200–600 microns average particle size, such as are experienced in conventional ground spraying equipment, the concentration of nutrients in the solution should be lower, and the rate of application of solution per acre correspondingly higher. It appears that this ratio of nutrient concentration to particle size decreases as the particle size increases. The appropriate concentration as a function of particle size is set forth in FIG. 1 of the drawing. For a given particle size, the appropriate range of nutrient concentration expressed in terms of aggregate pounds of N—$P_2O_5$—$K_2O$ per pound of $H_2O$ can be found. For example, in an aerial application wherein the solution average particle size is 300, reference to FIG. 1 indicates that the preferable range of aggregate nutrient concentration is 16 to 55%.

The following specific examples further illustrate the invention. In all of the examples, the "per acre foliar application of nitrogen, phosphorus and potassium-containing solutions is expressed as pounds of nitrogen, $P_2O_5$ and $K_2O$, respectively. This is in accordance with general practice. However, it should be noted that actual application of these elements is in the form of urea in the case of nitrogen, superpolyphosphate containing at least 55%, preferably 60% to 80% linear polyphosphate, in the case of phosphorus, and potassium.

EXAMPLE 1

A farm in North Carolina was planted as follows:
1. Soybean variety: Bragg - determinate type.
2. Fertilizer program: 400 Lbs. per acre of 3-9-18 broadcast before planting. 1 Ton per acre dolomitic limestone before planting.
3. Planting conditions: Date June 15; 38-inch row width; herbicide - Treflan, 1 quart per acre. Tenoran postemergence herbicide at first trifoliate stage; no cultivation.
4. Harvest Date: November 1, 1975. Applications of a 3 (N) — 20 ($P_2O_5$) — 18 ($K_2O$) solution (~ 55% $H_2O$) were made with a $CO_2$ pressurized back pack sprayer at the midbloom growth stage to a portion of the soybean field. The experimental design consisted of a randomized block with 4 replications.

Despite an early frost on October 2 and 3 (3.5 weeks before maturity of the Bragg variety), yield from the treated plots was as follows:

| Rate of 3-20-18 Acre (Gallons) | Lbs. N-$P_2O_5$-$K_2O$ Per Acre | Yield, Bushels/ Acre (Based on 4 Replications) |
|---|---|---|
| 0 (Control) | 0-0-0 | 19.4 |
| 10 | 3.3-22-20 | 23.5 |
| 20 | 6.6-44-40 | 22.9 |
| 30 | 9.9-66-60 | 23.7 |

EXAMPLE II

A farm in Brazil was planted as follows: Soybean type: Determinate — Davis & Santa Rosa varieties.
Fertilizer program: 250 lbs. 4-36-12 at planting.
Planting conditions: Row width 22 inch; herbicide dinitroaniline.
Applications of the following solutions and rates were made with (1) an airplane, 100 mph, and 40 psi pressure (not replicated), and (2) Hudson hand sprayer; replicated 6 times in a randomized block design. Rates of application are expressed as N—$P_2O_5$—$K_2O$ per acre.

1. Airplane —
   a. Davis — at late bean filling stage.

| Rate of Application Per Acre and Nutrient Content | Lbs. N-$P_2O_5$-$K_2O$ Per Acre | Yield, Bushels/ Acre (Not Replicated) |
|---|---|---|
| 0 - (Control) | 0 | 53.83 |
| 10 gallons of 3-20-18 | 3.3-22-20 | 53.68 |
| 30 gallons of 3-20-18 | 9.9-66-60 | 50.18 |
| 40 gallons of 8-8-8 | 38.2-35.2-35.2 | 54.43 |
| (b) Santa Rosa - at midbloom (no replication). | | |
| 0 - (Control) | 0 | 39.23 |
| 10 gallons of 3-20-18 | 3.3-22-20 | 46.71 |
| 30 gallons of 3-20-18 | 9.9-66-60 | 44.40 |
| 40 gallons of 8-8-8 | 35.2-35.2-35.2 | 40.73 |

2. Hudson Hand Sprayer —
   a. Santa Rosa — at midbloom (6 replications).

| | | Yield, Lbs./Plot |
|---|---|---|
| 0 - (Control) | 0 | 1.79 |
| 10 gallons of 3-20-18 | 3.3-22-20 | 1.75 |
| 20 gallons of 3-20-18 | 6.6-44-40 | 1.88 |
| 30 gallons of 3-20-18 | 9.9-66-60 | 1.82 |
| 10 gallons of 8-8-8 | 8.8-8.8-8.8 | 1.89 |

| | | Yield, Lbs./Plot |
|---|---|---|
| 30 gallons of 8-8-8 | 26.4-26.4-26.4 | 1.69* |

*Includes diseased plot

EXAMPLE III

The following are other examples of solutions and timing and rates of application that can also be used consistent with the present invention with soybeans:

| Rate of Application Per Acre and Nutrient Content | Timing |
|---|---|
| 10 gallons of 3-20-20 | Beginning flowering |
| 20 gallons of 3-20-20 | Midbloom |
| 30 gallons of 3-20-20 | Full bloom |
| 10 gallons of 5-15-15 | Beginning pod development |
| 30 gallons of 5-15-15 | Midbloom |
| 10 gallons of 8-12-12 | 2 days before flowering |
| 30 gallons of 8-12-12 | 2 days after beginning of pod development |
| 10 gallons of 10-10-10 | Midbloom |
| 30 gallons of 10-10-10 | Midbloom |

Other ingredients such as pesticides to perform other functions can also be added to the nutrient solutions of the invention.

Having described the invention above, applicants claim:

We claim:

1. A process for improving the yield of soybeans which comprises the step of treating the foliage of such soybeans with a solution consisting essentially of the following nutrient constituents:
   a. $H_2O$: 25 – 84% (expressed as weight);
   b. Urea: 3 – 25% (expressed as % N by weight);
   c. Predominantly linear polyphosphate having from 55 to 80% of the $P_2O_5$ present in the form "pyro," "tripoly" or higher linear polyphosphate: 5 – 30% (expressed as $P_2O_5$ by weight);
   d. Potassium: 5 – 30%, (expressed as $K_2O$ by weight);
   e. Ammoniacal N: Less than 3%;
   f. Cl: Less than 2%;
   g. $SO_4$: Less than 2%;
   h. Other micronutrients such as sulfur, boron, zinc, iron, manganese and copper: None to nominal amounts as desired; said solution being applied in a fine spray during the period starting shortly before flowering and ending shortly after beginning of pod development; and at a rate of at least 25 pounds aggregate $N-P_2O_5-K_2O$ per acre in the following proportions:

| Component | Rate of Application, Lbs./Acre |
|---|---|
| Urea (as N) | 2 – 60 |
| Phosphorus (as $P_2O_5$) | 2 – 75 |
| Potassium (as $K_2O$) | 2 – 75 |

2. A process for improving the yield of soybeans which comprises the step of treating the foliage of such soybeans with a solution consisting essentially of the following nutrient constituents:
   a. $H_2O$: 50 – 75% (expressed as weight);
   b. Urea: 3 – 15% (expressed as % N by weight);
   c. Predominantly linear polyphosphate having from 55 to 80% of the $P_2O_5$ present in the form "pyro," "tripoly" or higher linear polyphosphate: 5 – 25% (expressed as $P_2O_5$ by weight);
   d. Potassium: 5 – 25% (expressed as $K_2O$ by weight);
   e. Ammoniacal N: Less than 2%;
   f. Cl: Less than 1%;
   g. $SO_4$: Less than 1%;
   h. Other micronutrients such as sulfur, boron, zinc, iron, manganese and copper: None to nominal amounts as desired; said solution being applied in a fine spray during the period starting shortly before flowering and ending shortly after beginning of pod development; and at a rate of at least 25 pounds aggregate $N-P_2O_5-K_2O$ per acre in the following proportions:

| Component | Rate of Application, Lbs./Acre |
|---|---|
| Urea (as N) | 3 – 50 |
| Phosphorus (as $P_2O_5$) | 3 – 50 |
| Potassium (as $K_2O$) | 3 – 50 |

3. The method of claim 2 wherein the aggregate rate of application is 40 – 150 pounds of $N-P_2O_5-K_2O$ per acre.

4. The method of claim 2 wherein the aggregate rate of nutrient application is 40 – 75 pounds of $N-P_2O_5-K_2O$ per acre.

5. The method of claim 1 wherein the water component of the solution is present in a concentration of 50 to 75% based on the total weight of the solution.

6. The method of claim 2 wherein the urea was added to the solution in the form of urea liquor.

7. The method of claim 2 wherein the average particle size of the spray ranges from 50 to 600 microns and the aggregate concentration of nutrients in the solution, when plotted against the particle size, falls within the area surrounded by the solid line in FIG. 1.

8. A process for improving the yield of field crops which comprises the step of treating the foliage of such crops with a solution consisting essentially of the following nutrient constituents:
   a. $H_2O$: 25 – 84% (expressed as weight);
   b. Urea: 3 – 25% (expressed as % N by weight);
   c. Predominantly linear polyphosphate having from 55 to 80% of the $P_2O_5$ present in the form "pyro," "tripoly" or higher linear polyphosphate: 5 – 30% (expressed as $P_2O_5$ by weight);
   d. Potassium: 5 – 30%, preferably 5% – 25% (expressed as $K_2O$ by weight);
   e. Ammoniacal N: Less than 2% based on total solution weight;
   f. Cl: Less than 2%;
   g. $SO_4$: Less than 2%;
   h. Other micronutrients such as sulfur, boron, zinc, iron, manganese and copper: None to nominal amounts as desired; said solution being applied in a fine spray during the period starting shortly before flowering and ending shortly after beginning of seed set; and at a rate of at least 25 pounds aggregate $N-P_2O_5-K_2O$ per acre in the following proportions:

| Component | Rate of Application, Lbs.Acre |
|---|---|
| Urea (as N) | 2 – 60 |
| Phosphorus (as P₂O₅) | 2 – 75 |
| Potassium (as K₂O) | 2 – 75 |

9. The method of claim 8 wherein the aggregate rate of application is 40 –150 pounds of N—P$_2$O$_5$—K$_2$O per acre.

10. The method of claim 9 wherein the aggregate rate of application is 40 – 75 pounds of N—P$_2$O$_5$—K$_2$O per acre.

11. The method of claim 10 wherein the water component of the solution is present in a concentration of 50% to 75% based on the total weight of the solution.

12. The method of claim 11 wherein the urea was added to the solution in the form of urea liquor.

13. The method of claim 12 wherein the average particle size of the spray ranges from 50 to 600 microns and the aggregate concentration of nutrients in the solution, when plotted against the particle size, falls within the area surrounded by the solid line in FIG. 1.

14. A process for improving the yield of soybeans which comprises the step of treating the foliage of such soybeans with a solution comprising the following nutrient constituents:
   a. H$_2$O: 25 – 84% (expressed as weight);
   b. Urea: 3 – 25% (expressed as % N by weight);
   c. Predominantly linear polyphosphate having from 55% to 80% of the P$_2$O$_5$ present in the form "pyro," "tripoly" or higher linear polyphosphate: 5 – 30% (expressed as P$_2$O$_5$ by weight);
   d. Potassium: 5 – 30% (expressed as K$_2$O by weight);
   e. Ammoniacal N: Less than 3%; said solution being applied in a fine spray during the period starting shortly before flowering and ending shortly after beginning of pod development; and at a rate of at least 25 pounds aggregate N—P$_2$O$_5$—K$_2$O per acre in the following proportions:

| Component | Rate of Application, Pounds/Acre |
|---|---|
| Urea (as N) | 2 – 60 |
| Phosphorus (as P₂O₅) | 2 – 75 |
| Potassium (as K₂O) | 2 – 75 |

15. A process for improving the yield of soybeans which comprises the step of treating the foliage of such soybeans with a solution comprising the following nutrient constituents:
   a. H$_2$O: 25 – 84% (expressed as weight);
   b. Urea: 3 – 25% (expressed as % N by weight);
   c. Predominantly linear polyphosphate having from 55 to 80% of the P$_2$O$_5$ present in the form "pyro," "tripoly" or higher linear polyphosphate: 5 – 30% (expressed as P$_2$O$_5$ by weight);
   d. Potassium: 5 – 30% (expressed as K$_2$O by weight);
   e. Ammoniacal N: Less than 3%;
   f. Other micronutrients such as sulfur, boron, zinc, iron, manganese and copper: None to nominal amounts as desired; said solution being applied in a fine spray during the period starting shortly before flowering and ending shortly after beginning of pod development; and at a rate of at least 25 pounds aggregate N—P$_2$O$_5$—K$_2$O per acre in the following proportions:

| Component | Rate of Application, Pounds/Acre |
|---|---|
| Urea (as N) | 2 – 60 |
| Phosphorus (as P₂O₅) | 2 – 75 |
| Potassium (as K₂O) | 2 – 75 |

16. A composition capable of being applied as a foliar spray fertilizer, said composition comprising a solution of the following nutrient constituents:
   a. H$_2$O: 25 – 84% (by weight);
   b. Urea: 3 – 25% (% Nitrogen by weight);
   c. Predominantly linear polyphosphate having from 55% to 80% of the P$_2$O$_5$ present in the form "pyro," "tripoly" or higher linear polyphosphate: 5 – 30% (P$_2$O$_5$ by weight);
   d. Potassium: 5 – 30% (K$_2$O by weight); and
   e. Ammoniacal Nitrogen: Less than 3%.

17. The composition of claim 16 characterized by having a chloride ion content of less than 2% and a sulfate ion content of less than 2%.

18. The composition of claim 16 containing at least one micronutrient selected from the group consisting of sulfur, boron, zinc, iron, manganese and copper present in nominal amount.

19. The composition of claim 17 wherein the chloride ion content is less than 1% and the sulfate ion content is less than 1%, said composition containing at least one micronutrient selected from the group consisting of sulfur, boron, zinc, iron, manganese and copper present in nominal amount.

20. The composition of claim 16 wherein the aggregate concentration of nutrients in the solution, when plotted against the particle size, falls within the area surrounded by the solid line in FIG. 1.

21. The composition of claim 19 wherein the aggregate concentration of nutrients in the solution, when plotted against the particle size, falls within the are surrounded by the solid line in FIG. 1.

* * * * *

UNITED STATES PATENT AND TRADEMARK OFFICE
CERTIFICATE OF CORRECTION

PATENT NO. : 4,038,064
DATED : July 26, 1977
INVENTOR(S) : John G. Clapp, et al.

It is certified that error appears in the above-identified patent and that said Letters Patent are hereby corrected as shown below:

Column 1, line 14, "environment" should read -- environmental --.

Column 1, line 51, "20%" should read -- 30% --.

Column 6, line 24, "Lbs. Acres" should read -- Lbs./Acre --.

Column 6, line 50, before "Urea" insert -- b. --.

Signed and Sealed this

Eighteenth Day of July 1978

[SEAL]

Attest:

RUTH C. MASON
*Attesting Officer*

DONALD W. BANNER
*Commissioner of Patents and Trademarks*